(12) United States Patent
Eigler

(10) Patent No.: US 7,850,443 B2
(45) Date of Patent: Dec. 14, 2010

(54) APPARATUS FOR INJECTION MOLDING

(75) Inventor: Frank J. Eigler, Windsor (CA)

(73) Assignee: DME Company LLC, Madison Heights, MI (US)

(*) Notice: Subject to any disclaimer, the term of this patent is extended or adjusted under 35 U.S.C. 154(b) by 587 days.

(21) Appl. No.: 11/944,493

(22) Filed: Nov. 23, 2007

(65) Prior Publication Data
US 2009/0136611 A1 May 28, 2009

(51) Int. Cl.
B29C 45/66 (2006.01)
(52) U.S. Cl. .................. 425/588; 425/451.7; 425/589
(58) Field of Classification Search .............. 425/388, 425/588, 589, 451.7
See application file for complete search history.

(56) References Cited

U.S. PATENT DOCUMENTS

| 5,975,881 | A | * | 11/1999 | Langos et al. ............ 425/450.1 |
| 6,089,852 | A | | 7/2000 | Lee et al. |
| 6,106,265 | A | | 8/2000 | Von Holt |
| 6,250,906 | B1 | | 6/2001 | Kodric |
| 6,514,452 | B1 | | 2/2003 | Maier |
| 6,779,999 | B2 | | 8/2004 | Ciccone |
| 7,547,207 | B2 | * | 6/2009 | Berceanu et al. ............ 425/588 |
| 2003/0194461 | A1 | | 10/2003 | Ciccone |
| 2005/0167038 | A1 | * | 8/2005 | Torris et al. ................. 156/245 |

FOREIGN PATENT DOCUMENTS

DE 19610991 C1 1/1997

OTHER PUBLICATIONS

D-M-E Company, "Helical Gear Stack Mold Systems" (product brochure), Oct. 2006, USA.
International Search Report in PCT/US2008/004797 mailed by European Patent Office Aug. 4, 2008.
Written Opinion of the International Searching Authority in PCT/US2008/004797 mailed by European Patent Office Aug. 4, 2008.

* cited by examiner

Primary Examiner—James Mackey
(74) Attorney, Agent, or Firm—John W. Gregg

(57) ABSTRACT

An apparatus for injection molding using a stack mold comprising first and second mold assemblies interposed between a movable platen and a stationary platen comprises at least one centering device for coupling movement of the movable platen to intermediate mold members of the mold assemblies, the centering device comprising first and second helical gear mechanisms and a transmission coupling rotation of helical gear segments of the first and second helical gear mechanisms. Effective pitch of the helical gear mechanisms and the ratio of rotation coupled by the transmission are chosen to maintain the intermediate mold members centered in or offset from center in the separation between the movable platen and stationary platen.

14 Claims, 3 Drawing Sheets

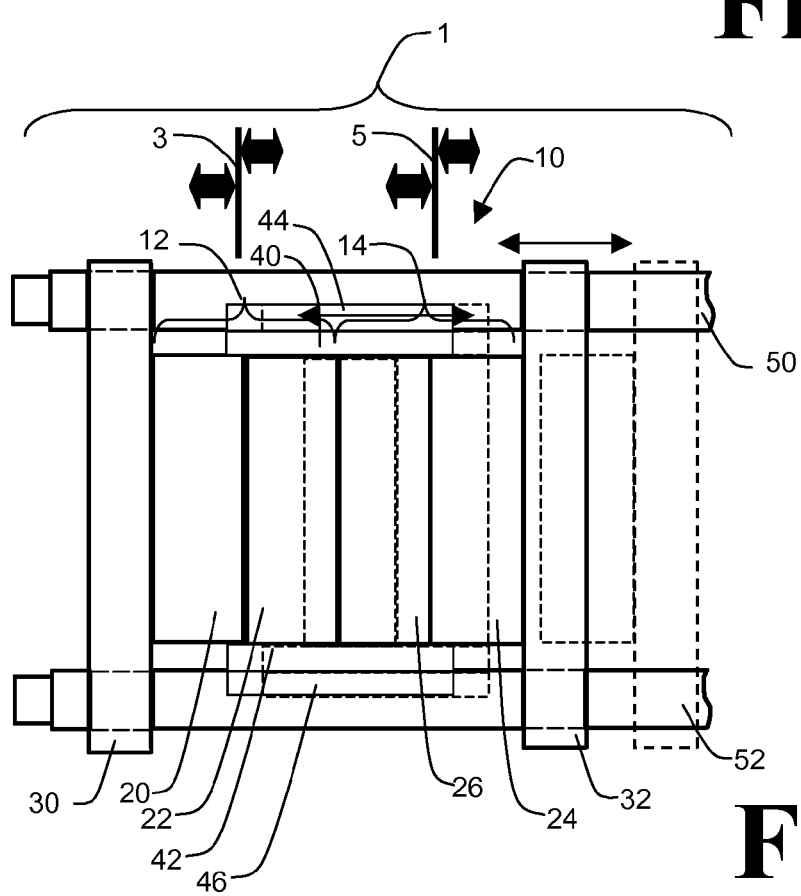
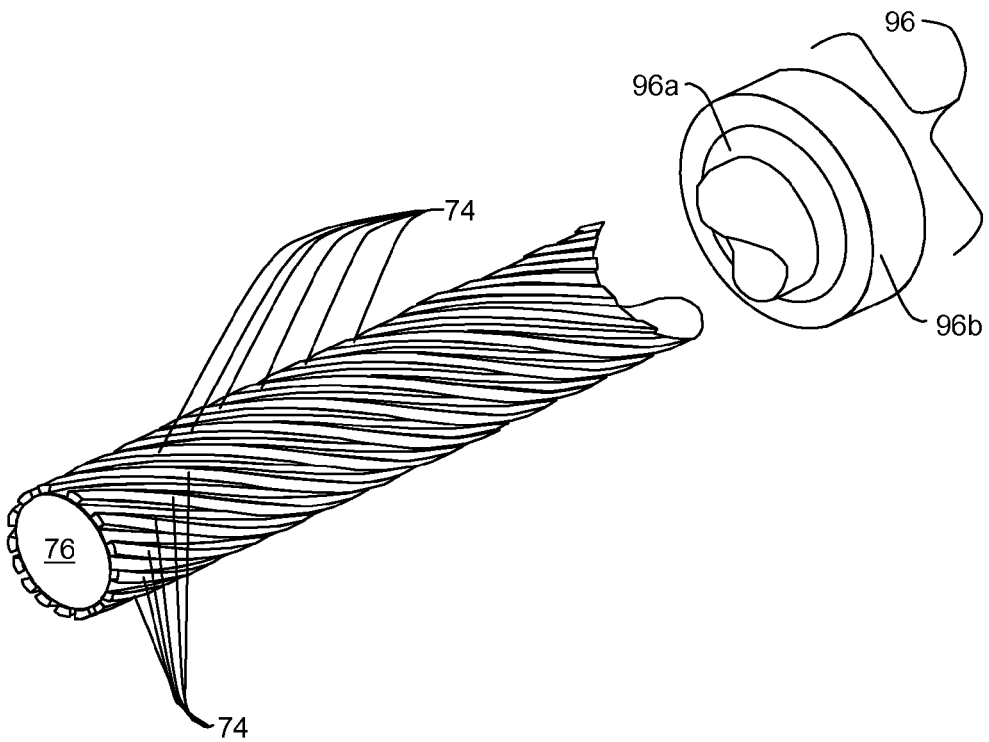

APPARATUS FOR INJECTION MOLDING

I. BACKGROUND OF THE INVENTION

1. Field of the Invention

This invention relates generally to injection molding. In particular, this invention relates to apparatus for moving intermediate mold members in so-called "stack mold" arrangements with movement of a movable platen.

2. Description of Related Art

It is known to arrange mold members in so-called "stack molds" to increase the number of articles that may be molded with a single cycle of operation of a molding machine. A "stack mold" is characterized as having two or more mold assemblies arranged so that intermediate mold members or mold assemblies are interposed between mold members mounted to, respectively, a stationary platen and a movable platen of a molding machine clamp unit. It is known to provide mechanisms for stack mold arrangements effective to "open" (separate) and "close" (engage) mating mold members of the two mold assemblies with movement of the movable platen. In certain of such known arrangements used in injection molding: a first mold assembly is arranged with a first mold member connected to a stationary platen (also referred to as a "fixed platen"); a second mold assembly is arranged with a third mold member connected to a movable platen; and a second mold member comprising the first mold assembly and a fourth mold member comprising the second mold assembly are supported so as to be interposed between and opposing, respectively, the first mold member and the third mold member and to be movable relative thereto. The interposed mating mold members are referred to herein collectively as "intermediate mold members" or "intermediate mating mold members". Opening and closing of the mold assemblies is effected by moving the movable platen and the intermediate mold members to separate and engage, respectively, the first and second mating mold members and the third and fourth mating mold members. Motion of the movable platen is effected by at least one actuator comprising a clamp mechanism and motion of the movable platen is mechanically coupled to the intermediate mold members.

It is known to couple motion of the movable platen to the intermediate mold members using such devices as pivoting arms, mechanical drive mechanisms comprising at least one rack and drive pinion and mechanical drive mechanisms comprising helical gears and engaged nuts. In known drive mechanisms comprising helical gears, two helical gear portions with equal and opposed pitch are arranged on one helical gear segment and a region of each of the helical gear portions is received within an elongated engaging nut. One of the elongated engaging nuts is connected to the first mold member and the other elongated engaging nut is connected to the third mating mold member. A bearing support is interposed between the helical gear portions and connected to the interposed arrangement of mating mold members. Translation of the moveable platen is converted to rotation of the helical gear segment by the elongated engaging nut attached to the movable platen. Rotation of the helical gear segment is converted into translation of the helical gear segment by the elongated engaging nut connected to the stationary platen. Translation of the helical gear segment is coupled to the interposed arrangement of mating mold members by the bearing support.

In known helical gear mechanisms, the total length of the helical gear segment must be longer than the length of the desired separation of mating mold components of both mold assemblies to insure that the helical gear segment remains engaged with the elongated nuts when the mold assemblies are open. This length requirement may result in the length of the helical gear mechanism exceeding the separation between the opposed faces of the fixed platen and the movable platen when both mold assemblies are closed. In such circumstances, the helical gear segment can be arranged in the clamp unit to be outside the perimeter of the platens or the platens can be provided with clearance openings to accommodate the excess length of the helical gear mechanism. In the event the former is elected, substantial supports for the helical gear drive mechanism are required to resist deflection due to forces acting on the helical gear drive mechanism. In the event the latter is elected, placement of the clearance openings may be restricted by other components in the clamp unit. Hence, there is a need for an improved drive mechanism comprising helical gears and engaged nuts that is suitable for applications to accommodate large separations of mating mold components while permitting the helical gear drive mechanism to be located within the outline of the clamp unit platens without requiring clearance openings in those platens.

II. SUMMARY OF THE INVENTION

It is an object of the present invention to provide an apparatus for injection molding using a stack mold comprising first and second mold assemblies interposed between a movable platen and a stationary platen wherein movement of the movable platen is coupled to intermediate mold members of the mold assemblies by at least one centering device comprising first and second helical gear mechanisms and a transmission coupling rotation of helical gear segments of the first and second helical gear mechanisms.

It is a further object of the present invention to provide an apparatus for injection molding using a stack mold comprising first and second mold assemblies interposed between a movable platen and a stationary platen wherein movement of a movable platen is coupled to intermediate mold members of the mold assemblies by at least one centering device comprising first and second helical gear mechanisms and a transmission coupling rotation of helical gear segments of the first and second helical gear mechanisms wherein the effective pitches of the helical gear mechanisms are equal and the ratio of rotation coupled by the transmission is unity so that the intermediate mold members remain centered in the separation between the movable platen and stationary platen.

It is a further object of the present invention to provide an apparatus for injection molding using a stack mold comprising first and second mold assemblies interposed between a movable platen and a stationary platen wherein movement of a movable platen is coupled to intermediate mold members of the mold assemblies by at least one centering device comprising first and second helical gear mechanisms and a transmission coupling rotation of helical gear segments of the first and second helical gear mechanisms wherein the effective pitches of the helical gear mechanisms and the ratio of rotation coupled by the transmission are such that that the intermediate mold members remain offset from the center of the separation between the movable platen and stationary platen.

Further objects and advantages of the invention shall be made apparent from the accompanying drawings and the following description thereof.

In accordance with the aforesaid objects the present invention provides an apparatus for injection molding using a stack mold comprising first and second mold assemblies, the first mold assembly comprising a first mold member connected to a stationary platen of a clamp unit and a second mold member, the first and second mold members configured for mating engagement to form at least one mold cavity, the second mold assembly comprising a third mold member connected to a movable platen of the clamp unit and a fourth mold member, the third and fourth mold members configured for mating engagement to form at least one mold cavity, the movable platen being movable relative to the stationary platen, the second and fourth mold members being connected to one another and being movable relative to the stationary platen, the apparatus comprising at least one centering device for effecting translation of the second and fourth mold members with translation of the movable platen, the centering device comprising first and second helical gear mechanisms, each helical gear mechanism comprising a helical gear segment engaged with an elongated nut and a bearing support for receiving the end of the helical gear segment not engaged with the elongated nut, the helical gear segment being rotatable relative to the bearing support, and a transmission coupling rotation of the helical gear segments of the first and second helical gear mechanisms, the elongated nut of the first helical gear mechanism being connected to the movable platen, the elongated nut of the second helical gear mechanism being connected to the stationary platen, and the bearing supports of the first and second helical gear mechanisms being connected to the second and fourth mold members so that with translation of the movable platen relative to the stationary platen the centering device is effective to translate the second and fourth mold members in a manner that translation of the movable platen toward the stationary platen is effective to reduce separation between the first and second mold members and between the third and fourth mold members and translation of the movable platen away from the stationary platen is effective to increase separation between the first and second mold members and between the third and fourth mold members, whereby movement of the movable platen is effective to engage and separate the first and second mold members and to engage and separate the third and fourth mold members.

III. BRIEF DESCRIPTION OF THE DRAWINGS

FIG. 1 is a side view of a clamp unit of a molding machine.

FIG. 3 is a segmented enlarged view of a helical gear segment of a helical gear mechanism in accordance with the invention.

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 2:
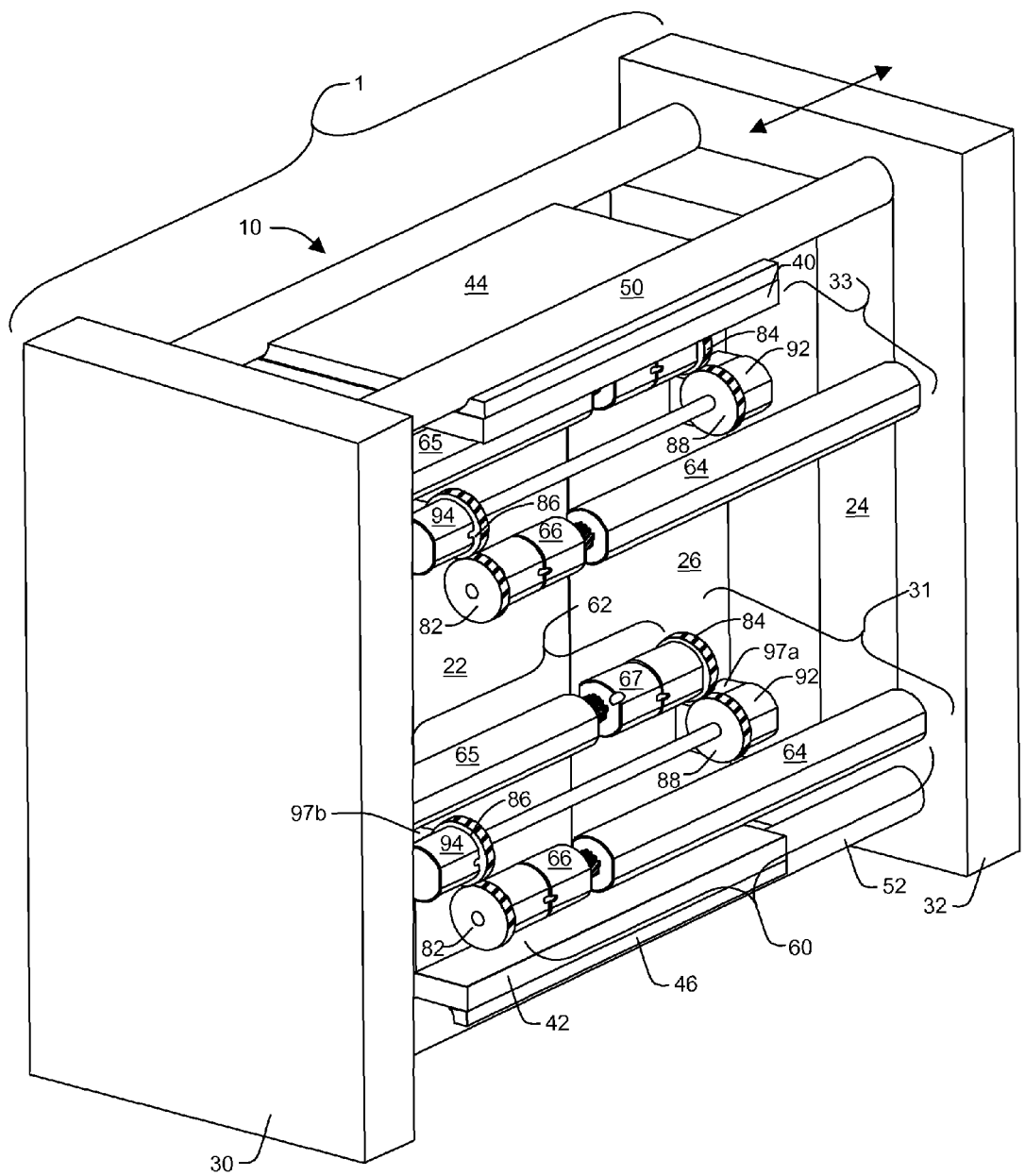
FIG. 2 is a perspective view of the clamp unit of FIG. 1 showing application of helical gear centering devices in accordance with the invention to one side thereof.

Referring to FIGS. 1 and 2, a portion of a clamp unit 1 of a molding machine is shown in which a so-called "stack mold" 10 is installed. Stack mold 10 comprises first mold assembly 12 and second mold assembly 14. Parting line 3 represents the parting plane of mold members of first mold assembly 12 and parting line 5 represents the parting plane of second mold assembly 14. First mold assembly 12 comprises first mold member 20 and second mold member 22, first and second mold members 20 and 22 configured for mating engagement to form at least one mold cavity defining the shape and size of articles to be molded. Second mold assembly 14 comprises third mold member 24 and fourth mold member 26, third and fourth mold members configured for mating engagement to form at least one mold cavity defining the shape and size of articles to be molded. First mold member 20 is connected to stationary platen 30, third mold member 24 is connected to movable platen 32, and second mold member 22 is connected, directly or indirectly to fourth mold member 26, the mold members 22 and 26 being interposed between stationary mold member 20 and third mold member 24 (mold members 22 and 26 collectively referred to as the "intermediate mold members"). Mold assemblies 12 and 14 are "opened", i.e., mating mold members 20 and 22 and mating mold members 24 and 26 are separated, and "closed", i.e., mating mold members 20 and 22 and mating mold members 24 and 26 are engaged, by movement of movable platen 32 relative to stationary platen 30 which remains stationary. By virtue of connection of mold member 20 to stationary platen 30, mold member 20 is a stationary mold member. Opening and closing of mold assemblies 12 and 14 occurs relative to the parting planes represented by parting lines 3 and 5, respectively. Movement of movable platen 32 is coupled to intermediate mold members 22 and 26 by a mechanism such as a centering device 31 (FIG. 2) so that the intermediate mold members are moved relative to stationary platen 30 with movement of movable platen 32.

Although not shown in the drawings, mold members 20-26 may comprise one or more mold base members for receiving and supporting manifolds, nozzles, ejector mechanisms, and other devices well known for use in injection molding. For example, any two of mold members 20, 22 and 26 may comprise a manifold plate in which a melt distribution manifold is mounted, and a nozzle retention plate in which are mounted nozzle assemblies. Each of mold members 20-26 may comprise a cavity or core plate to which is mounted mold surface members comprising molding surfaces. A melt distribution manifold (not shown) comprises melt conducting passages to convey melt from a manifold inlet communicating with an injection unit to a plurality of manifold outlets communicating with mold cavities. A single melt distribution manifold may be supported with the intermediate mold members 22 and 26 to distribute melt to mold assemblies 12 and 14 or two melt distribution manifolds may be provided, one proximate mold member 20 to distribute melt to mold assembly 12 and the other proximate mold member 26 to distribute melt to mold assembly 14. A nozzle assembly comprises at least one nozzle passage (not shown) for conducting melt and that comprise a segment of reduced cross section for increasing the rate of flow of melt as the melt enters mold cavities. Further, each of mold members 22 and 24 may comprise ejector housing plates within which an ejector mechanism can e disposed for effecting release of molded articles from mold cavities.

Each of mold members 20-26 comprises at least one mold surface member (not shown) comprising molding surfaces defining the shape and size of articles to be molded. Mold base members comprising mold members 20-26 are arranged relative to the mold surface members so that molding surfaces of mating mold members are exposed. Hence, mold base members comprising mold member 20 are interposed between the molding surface members of mold member 20 and stationary platen 30; mold base members comprising mold member 22 are interposed between the molding surface members of mold member 22 and mold member 26; mold base members comprising mold member 26 are interposed between the molding surface members of mold member 26 and mold member 22; and, mold base members comprising mold member 24 are interposed between the mold surface members comprising mold member 24 and movable platen 32. With mold assemblies 12 and 14 "closed" mold surface members of mating mold members 20 and 22 are brought into engagement and mold surface members of mating mold members 24 and 26 are brought into engagement, the engaged mold surface members of mating mold members defining cavities establishing the shape and size of articles to be molded.

Continuing with reference to FIGS. 1 and 2, header 40 is attached to the upper ends of intermediate mold members 22 and 26 and footer 42 is attached to lower ends of intermediate mold members 22 and 26. Guides, such as guides 44 and 46 are attached to header 40 and footer 42, respectively, and slide on members of clamp unit 1 such as tie bars 50 and 52. A so-called "centering device" 31 comprises a pair of helical gear mechanisms 60 and 62. Centering device 31 (FIG. 2) is effective to couple movement of movable platen 32 to the intermediate mold members so as movable platen 32 is moved in translation, intermediate mold members 22 and 26 are moved in translation in the same direction whereby movement in translation of movable platen 32 away from stationary platen 30 is effective to open mold assemblies 12 and 14 and movement in translation of movable platen 32 toward stationary platen 30 is effective to close mold assemblies 12 and 14. As illustrated in FIG. 2, two such centering devices 31 and 33 are applied in spaced relation at the sides of mating mold members 22 and 26. The pair of centering devices 31 and 33 is effective to reduce or eliminate torques acting on the intermediate mold assemblies tending to incline the intermediate mold members relative to the tie bars of clamp unit 1.

Figure 4:
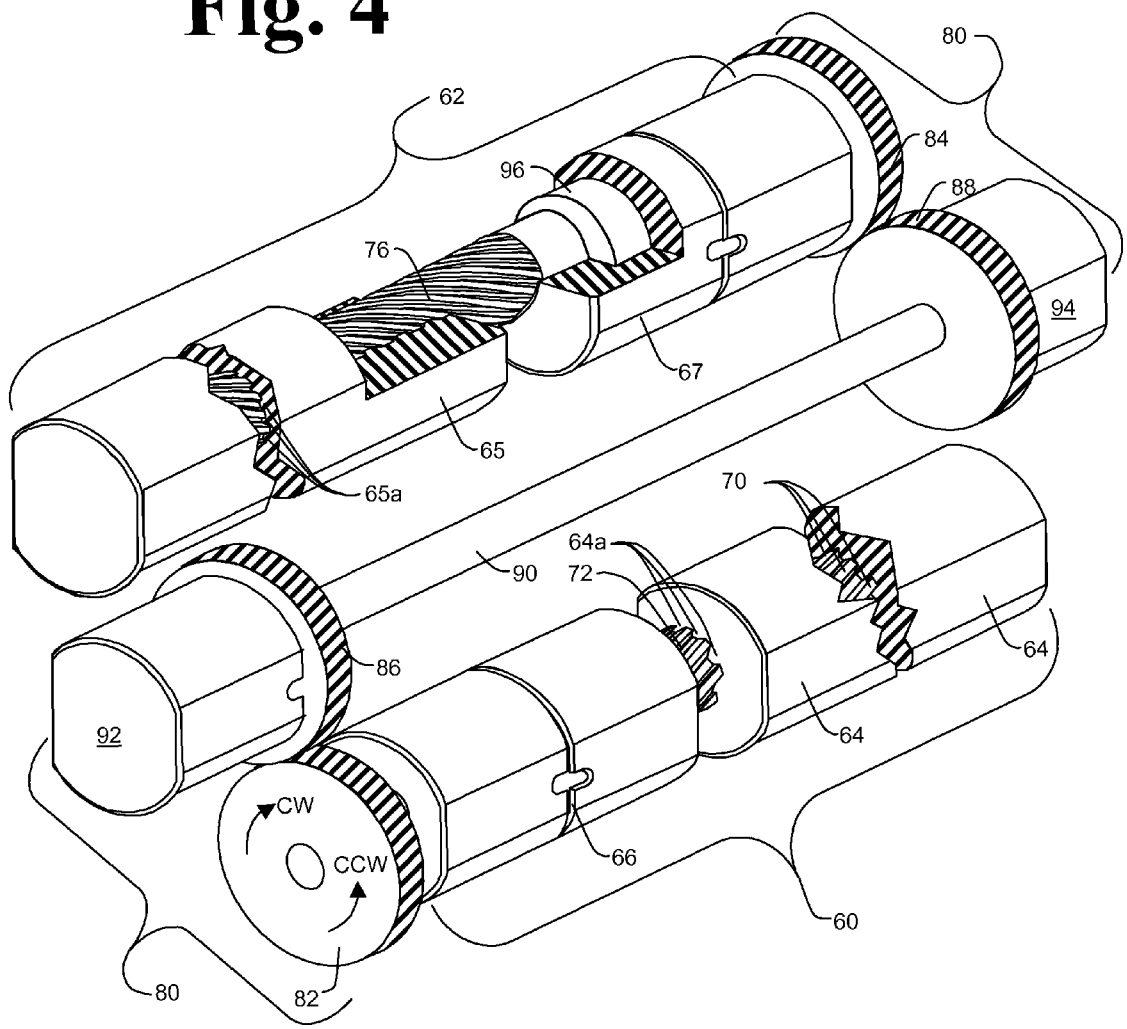
FIG. 4 is a segmented enlarged partial sectional view of coupled helical gear mechanisms in accordance with the invention.

Referring to FIGS. 2, 3 and 4, a centering device, such as centering device 31, in accordance with the invention is illustrated as comprising a pair of helical gear mechanisms 60 and 62 and a transmission 80 coupling helical gear mechanisms 60 and 62. Use of two coupled helical gear mechanisms reduces the overall length of the centering device required for use with mold assemblies having relatively large spans of separation of mating mold components. Referring to helical gear mechanism 62, helical gear teeth 74 of second helical gear segment 76 engage internal helical gear teeth 65a of second elongated nut 65, as shown in the partial cross section of FIG. 4. Effective pitch of the helical gear mechanism 62 is the ratio of magnitude of change of relative longitudinal position of helical gear segment 76 and second elongated nut 65 to a predetermined magnitude of rotation of helical gear segment 76, the engagement of helical gear segment 76 and second elongated nut 65 being effective to change the relative longitudinal positions thereof in response to rotation of helical gear segment 76. Second elongated nut 65 is connected directly or indirectly to stationary platen 30 so as to be stationary. Bearing support 67 is connected to the intermediate mold members, advantageously to second mating mold member 26, so as to be translatable with the intermediate mold members. Bearing support 67 receives the end of second helical gear segment 76 that is not engaged with second elongated nut 65 in a rotating bearing unit 96, advantageously, a tapered roller bearing, allowing rotation of second helical gear segment 76 relative to bearing support 67 and preventing translation of helical gear segment relative to bearing support 67. As seen in FIG. 3, bearing unit 96 comprises, advantageously, a bearing inner race 96a and a bearing outer race 96b, the bearing inner race 96a being rotatable relative to the bearing outer race 96b. As illustrated in FIGS. 3 and 4, bearing inner race 96a is attached to second helical gear segment 76 so as to be immovable relative thereto and bearing outer race 96b is attached to bearing support 67 so as to be immovable relative thereto. With such an arrangement, second helical gear segment 76 is rotatable relative to bearing support 67 and is not translatable relative to bearing support 67.

Continuing with reference to FIGS. 2, 3 and 4 and referring to helical gear mechanism 60, helical gear teeth 70 of first helical gear segment 72 engage internal gear teeth of first elongated nut 64, such as internal helical gear teeth 64a, in a manner similar to the engagement of helical gear teeth 74 with internal helical gear teeth 65a. Effective pitch of the helical gear mechanism 60 is the ratio of the magnitude of change of relative longitudinal position of helical gear segment 72 and first elongated nut 64 to a predetermined magnitude of rotation of helical gear segment 72, the engagement of helical gear segment 72 and first elongated nut 64 being effective to produce the change of longitudinal position in response to rotation of helical gear segment 72. First elongated nut 64 is connected directly or indirectly to movable platen 32, so as to be translatable with movable platen 32. Bearing support 66 is connected to the intermediate mold members, advantageously to mold member 22, so as to be translatable with the intermediate mold members. Bearing support 66 receives the end of first helical gear segment 72 that is not engaged with elongated nut 64 in a rotating bearing unit (not shown), advantageously similar to bearing unit 96 so as to allow rotation of first helical gear segment 72 relative to bearing support 66 and to prevent translation of first helical gear segment 72 relative to bearing support 66.

Rotation of first helical gear segment 72 and rotation of second helical gear segment 76 are coupled through transmission 80. Transmission 80 comprises drive gear 82, driven gear 84, first intermediate gear 86, second intermediate gear 88 and gear shaft 90 connecting first and second intermediate gears 86 and 88. Gear shaft 90 is rotatably supported by transmission bearing supports 92 and 94 connected to the intermediate mold members. Drive gear 82 is supported by an extension of the end of first helical gear segment 72 received in bearing support 66 and is rotated relative to bearing support 66 with rotation of first helical gear segment 72. Driven gear 84 is supported by an extension of the end of second helical gear segment 76 received in bearing support 67 and is rotated relative to bearing support 67. Each of bearing supports 92 and 94 comprise rotating bearing units (not shown) allowing rotation of gear shaft 90 relative to bearing supports 92 and 94 and prohibiting translation of gear shaft 90 relative to bearing supports 92 and 94. First intermediate gear 86 engages drive gear 82 and is rotated with rotation of drive gear 82. Driven gear 84 engages second intermediate gear 88 and is rotated by rotation of intermediate gear 88. Rotation of drive gear 82 is thereby coupled through transmission 80 to driven gear 84 and rotation of driven gear 84 is coupled through transmission 80 to drive gear 82. As seen in FIG. 2, bearing supports 92 and 94 are mounted to standoffs 97a and 97b (FIG. 2), respectively. Standoffs 97a and 97b are attached to the intermediate mold members and establish positions for bearing supports 92 and 94 effective to reduce the transverse distance between helical gear mechanism 60 and helical gear mechanism 62.

Continuing with reference to FIGS. 2, 3 and 4, by virtue of connection of elongated nut 64 with movable platen 32, translation of movable platen 32 translates elongated nut 64 along the length of first helical gear segment 72. Internal helical teeth 64a of elongated nut 64 engage helical teeth 70 of first helical gear segment 72 so that translation of first elongated nut 64 relative to first helical gear segment 72 imparts rotation to first helical gear segment 72 in accordance with the inverse of effective pitch of helical gear mechanism 60. Rotation of first helical gear segment 72 is coupled through transmission 80 to rotate second helical gear segment 76. As illustrated, teeth 74 (FIGS. 3 and 4) of second helical gear segment 76 engage internal helical teeth 65a of elongated nut 65 so that rotation of second helical gear segment 76 effects a change of longitudinal position of helical gear segment 76 relative to second elongated nut 65 in accordance with the effective pitch of helical gear mechanism 62. Helical teeth 74 and internal helical teeth 65a are oriented to effect movement of second helical gear segment 76 in a direction to decrease penetration of second helical gear segment 76 in elongated nut 65 with clockwise rotation of second helical gear segment 76 and to effect movement of second helical gear segment 76 in a direction to increase penetration of second helical gear segment 76 in elongated nut 65 with counter-clockwise rotation of second helical gear segment 76. As illustrated (FIG. 4), teeth 70 of first helical gear segment 72 are oriented to effect counter-clockwise rotation of first helical gear segment 72 with movement of moveable platen 32 toward stationary platen 30 and, conversely, to effect clockwise rotation of first helical gear segment 72 with movement of movable platen 32 away from stationary platen 30. Clockwise rotation is indicated in FIG. 4 by the directional arrow labeled "CW" on drive gear 82. Counter-clockwise rotation is indicated in FIG. 4 by the directional arrow labeled "CCW" on drive gear 82. Counter-clockwise rotation of first helical gear segment 72 effects counter-clockwise rotation of second helical gear segment 76 and clockwise rotation of first helical gear segment 72 effects clockwise rotation of second helical gear segment 76. Hence, movement of movable platen 32 toward stationary platen 30 effects movement of second helical gear segment 76 in a direction to increase penetration of second helical gear segment 76 into elongated nut 65 and movement of movable platen 32 away from stationary platen 30 effects rotation of second helical gear segment 76 in a direction to decrease penetration of second helical gear segment 76 into elongated nut 65.

Where transmission 80 is effective to couple rotation between helical gear mechanism 60 and helical gear mechanism 62 at a ratio of unity, and where effective pitch of helical gear mechanisms 60 and 62 are equal, operation of helical gear mechanisms 60 and 62, transmission 80 and the intermediate mold members is effective to maintain the intermediate mold members centered in the separation between stationary platen 30 and movable platen 32. As movable platen 32 is moved to increase separation of mating mold components, i.e. to "open" mold assemblies 12 and 14, elongated nut 64 is moved (translated) away from first helical gear segment 72 effecting clockwise rotation of first helical gear segment 72. The resulting clockwise rotation of second helical gear segment 76 effects translation of second helical gear segment 76 in a direction to decrease penetration of second helical gear segment 76 in elongated nut 65, i.e., translation of helical gear segment 76 away from stationary platen 30. That translation of helical gear segment 76 effects movement (translation) of intermediate mold members away from stationary platen 30. Translation of intermediate mold members away from stationary platen 30 effects translation of first helical gear segment 72 toward movable platen 32, so as to reduce net translation of elongated nut 64 relative to first helical gear segment 72, yielding a reduced net rotation of first helical gear segment 72. The net translation of movable platen 32 and elongated nut 64 relative to first helical gear segment 72 together with translation of the intermediate mold members will equal the magnitude of translation of movable platen 32 away from stationary platen 30. As the net translation of movable platen 32 relative to first helical gear segment 72 will equal the translation of the intermediate mold members away from stationary platen 30, i.e. the net translation being converted to net rotation of helical gear segment 72 and net rotation of helical gear segment 72 being converted to translation of the intermediate mold members, the translation of the intermediate mold members away from stationary platen 30 will equal half the translation of movable platen 32 away from stationary platen 30. Hence, as movable platen 32 is moved away from stationary platen 30, the coupled helical gear mechanisms 60 and 62 are effective to maintain the intermediate mold members in the center of the separation between movable platen 32 and stationary platen 30.

Likewise, where transmission 80 is effective to couple rotation between helical gear mechanism 60 and helical gear mechanism 62 at a ratio of unity, and where effective pitch of helical gear mechanisms 60 and 62 are equal, as movable platen 32 is moved to decrease separation of mating mold components, i.e. to "close" mold assemblies 12 and 14, the intermediate mold members will remain centered in the separation between stationary platen 30 and movable platen 32. With translation of movable platen 32 toward stationary platen 30 elongated nut 64 moves (translates) toward first helical gear segment 72, effecting counter-clockwise rotation of first helical gear segment 72, driving counter-clockwise rotation of second helical gear segment 76. Counter-clockwise rotation of second helical gear segment 76 drives intermediate mold members toward stationary platen 30, translating first helical gear segment 72 away from movable platen 32 and reducing the net translation of elongated nut 64 relative to first helical gear segment 72. The reduced net translation of elongated nut 64 relative to first helical gear segment 72 reduces net rotation of first helical gear segment 72, reducing rotation of second helical gear segment 76 and translation of the intermediate mold members toward stationary platen 30. The resultant translation of the intermediate mold members toward stationary platen 30 is half the translation of movable platen 32 toward stationary platen 30. Hence, where transmission 80 is effective to equalize rotation of the first and second helical gear segments and the first and second helical gear mechanisms have equal effective gear pitch, as movable platen 32 is moved toward stationary platen 30, the coupled helical gear mechanisms 60 and 62 of the centering devices 31 and 33 are effective to maintain the intermediate mold members in the center of the separation between movable platen 32 and stationary platen 30. If mold assemblies 12 and 14 are such that it is not desirable for the intermediate mold members to be centered in the separation between stationary platen 30 and movable platen 32, different conversions of rotation and translation can be effected with first and second helical gear mechanisms 60 and 62 and transmission 80. In particular, the effective pitch of helical gear mechanisms 60 and 62 can be made different, the transmission gearing can produce a ratio of rotation coupled between drive gear 82 and driven gear 80 other than unity, or a combination of different effective pitch and non unity transmission ratio may be employed.

Referring to FIGS. 1 and 2, the effective length of each of helical gear segments 72 and 76 must be greater than the desired separation of mating mold components of mold assemblies 12 and 14, respectively. That is, with mold assemblies 12 and 14 open, the helical gear segments 72 and 76 must remain engaged with elongated nuts 64 and 65, respectively. By virtue of the overlapping arrangement of helical gear mechanisms 60 and 62, the required length of helical gear segments 72 and 76 is accommodated in the space between stationary platen 30 and movable platen 32 when mold assemblies 12 and 14 are closed. Hence, the invention is effective to permit use of centering devices comprising helical gear segments for stack molds where the desired separation of mating mold components of the mold assemblies is relatively large without requiring mounting helical gear segments to be outside the outline of the platens of the clamp unit or clearance openings through the platens to accommodate excess length of the helical gear segments.

Although illustrated as comprising intermeshing gears, transmission 80 could comprise other arrangements for coupling rotation of first and second helical gear segments 72 and 76. Further, although the first and second helical gear mechanisms are illustrated as oppositely handed, i.e. as having opposite orientations of gear teeth determining the directions of rotation and translation produced by relative rotation and translation of the helical gear segments and elongated nuts, helical gear mechanisms of the same hand could be substituted. In such an arrangement, relative rotation and translation of the helical gear segment and elongated nut of each helical gear mechanism would produce rotation and translation in the same direction. In such an arrangement, transmission 80 would be configured to effect a reversal of the direction of rotation coupled between drive gear 82 and driven gear 84 to result in the desired direction of translation of the intermediate mold members in response to translation of movable platen 32.

What is claimed is:

1. Apparatus for injection molding using a stack mold comprising first and second mold assemblies, the first mold assembly comprising a first mold member connected to a stationary platen of a clamp unit and a second mold member, the first and second mold members configured for mating engagement to form at least one mold cavity, the second mold assembly comprising a third mold member connected to a movable platen of the clamp unit and a fourth mold member, the third and fourth mold members configured for mating engagement to form at least one mold cavity, the movable platen being movable relative to the stationary platen, the second and fourth mold members being connected to one another and being movable relative to the stationary platen, the apparatus comprising at least one centering device for effecting translation of the second and fourth mold members with translation of the movable platen, the centering device comprising first and second helical gear mechanisms having an overlapping arrangement in the space between the stationary platen and the movable platen, each helical gear mechanism comprising a helical gear segment engaged with an elongated nut and a bearing support for receiving the end of the helical gear segment not engaged with the elongated nut, the helical gear segment being rotatable relative to the bearing support, and a transmission coupling rotation of the helical gear segments of the first and second helical gear mechanisms, the elongated nut of the first helical gear mechanism being connected to the movable platen, the elongated nut of the second helical gear mechanism being connected to the stationary platen, and the bearing supports of the first and second helical gear mechanisms being connected to the second and fourth mold members so that with translation of the movable platen relative to the stationary platen the centering device is effective to translate the second and fourth mold members in a manner that translation of the movable platen toward the stationary platen is effective to reduce separation between the first and second mold members and between the third and fourth mold members and translation of the movable platen away from the stationary platen is effective to increase separation between the first and second mold members and between the third and fourth mold members, whereby movement of the movable platen is effective to engage and separate the first and second mold members and to engage and separate the third and fourth mold members.

2. The apparatus according to claim 1 wherein the transmission comprises a drive gear attached to an extension of the end of the helical gear segment received in the bearing support of the first helical gear mechanism, a driven gear attached to an extension of the helical gear segment received in the bearing support of the second helical gear mechanism, a first intermediate gear engaged with the drive gear, a second intermediate gear engaged with the driven gear and a gear shaft connecting the first and second intermediate gears.

3. The apparatus according to claim 2 wherein the effective pitch of the first and second helical gear mechanisms are equal and the transmission couples rotation between the helical gear segments of the first and second helical gear mechanisms in a ratio equal to unity so that as the movable platen is translated, the third and fourth mold members are translated through a distance equal to half the distance of translation of the movable platen relative to the stationary platen and the third and fourth mold members remain centered in the separation between the movable platen and stationary platen.

4. The apparatus according to claim 3 wherein the effective pitch of the first and second helical gear mechanisms are of opposite hand and the transmission couples rotation between the helical gear segments of the first and second helical gear mechanisms in the same direction.

5. The apparatus according to claim 3 wherein the effective pitch of the first and second helical gear mechanisms are of the same hand and the transmission couples rotation between the helical gear segments of the first and second helical gear mechanisms in reverse direction.

6. The apparatus according to claim 2 wherein the effective pitch of the first and second helical gear mechanisms are different and the transmission couples rotation between the helical gear segments of the first and second helical gear mechanisms in a ratio equal to unity so that as the movable platen is translated, the third and fourth mold members are translated through a distance other than half the distance of translation of the movable platen relative to the stationary platen and the third and fourth mold members remain offset from the center of separation between the movable platen and stationary platen.

7. The apparatus according to claim 6 wherein the effective pitch of the first and second helical gear mechanisms are of opposite hand and the transmission couples rotation between the helical gear segments of the first and second helical gear mechanisms in the same direction.

8. The apparatus according to claim 2 wherein the effective pitch of the first and second helical gear mechanisms are equal and of the same hand and the transmission couples rotation between the helical gear segments of the first and second helical gear mechanisms in reverse direction.

9. The apparatus according to claim 2 wherein the effective pitch of the first and second helical gear mechanisms are equal and the transmission couples rotation between the helical gear segments of the first and second helical gear mechanisms in a ratio different from unity and as the movable platen is translated, the third and fourth mold members are translated through a distance different from half the distance of translation of the movable platen relative to the stationary platen and the third and fourth mold members remain offset from the center of separation between the movable platen and the stationary platen.

10. The apparatus according to claim 9 wherein the effective pitch of the first and second helical gear mechanisms are of opposite hand and the transmission couples rotation between the helical gear segments of the first and second helical gear mechanisms in the same direction.

11. The apparatus according to claim 9 wherein the effective pitch of the first and second helical gear mechanisms are of the same hand and the transmission couples rotation between the helical gear segments of the first and second helical gear mechanisms in reverse direction.

12. The apparatus according to claim 2 wherein the effective pitch of the first and second helical gear mechanisms are different and the transmission couples rotation between the helical gear segments of the first and second helical gear mechanisms in a ratio different from unity and as the movable platen is translated, the third and fourth mold members are translated through a distance different from half the distance of translation of the movable platen relative to the stationary platen and the third and fourth mold members remain offset from the center of separation between the movable platen and the stationary platen.

13. The apparatus according to claim 12 wherein the effective pitch of the first and second helical gear mechanisms are of opposite hand and the transmission couples rotation between the helical gear segments of the first and second helical gear mechanisms in the same direction.

14. The apparatus according to claim 12 wherein the effective pitch of the first and second helical gear mechanisms are of the same hand and the transmission couples rotation between the helical gear segments of the first and second helical gear mechanisms in reverse direction.

* * * * *